US009250925B2

(12) United States Patent
Scipione

(10) Patent No.: US 9,250,925 B2
(45) Date of Patent: Feb. 2, 2016

(54) ADDING INHERITANCE SUPPORT TO A COMPUTER PROGRAMMING LANGUAGE

(75) Inventor: Angelo Scipione, Weston, MA (US)

(73) Assignee: Sybase, Inc., Dublin, CA (US)

( * ) Notice: Subject to any disclaimer, the term of this patent is extended or adjusted under 35 U.S.C. 154(b) by 1096 days.

(21) Appl. No.: 12/759,436

(22) Filed: Apr. 13, 2010

(65) Prior Publication Data
US 2011/0252400 A1    Oct. 13, 2011

(51) Int. Cl.
*G06F 9/44*     (2006.01)
*G06F 9/46*     (2006.01)

(52) U.S. Cl.
CPC ............... *G06F 9/4433* (2013.01); *G06F 8/24* (2013.01); *G06F 9/465* (2013.01)

(58) Field of Classification Search
CPC .......... G06F 8/24; G06F 9/465; G06F 9/4433
See application file for complete search history.

(56) References Cited

U.S. PATENT DOCUMENTS

| | | | | |
|---|---|---|---|---|
| 5,481,721 | A * | 1/1996 | Serlet et al. | 719/315 |
| 5,630,131 | A * | 5/1997 | Palevich et al. | 717/108 |
| 5,652,884 | A * | 7/1997 | Palevich | 713/1 |
| 5,689,664 | A * | 11/1997 | Narayanan et al. | 715/769 |
| 6,182,156 | B1 * | 1/2001 | Togawa | 719/316 |
| 6,230,159 | B1 * | 5/2001 | Golde | G06F 9/4433 1/1 |
| 6,601,233 | B1 * | 7/2003 | Underwood | G06F 8/24 717/100 |
| 6,668,257 | B1 * | 12/2003 | Greef et al. | 1/1 |
| 6,704,743 | B1 * | 3/2004 | Martin | G06F 9/4433 707/786 |
| 7,051,336 | B1 * | 5/2006 | Brown | G06F 8/24 700/121 |
| 8,732,656 | B2 * | 5/2014 | Ahadian et al. | 717/106 |
| 2004/0015842 | A1 * | 1/2004 | Nanivadekar | G06F 8/34 717/109 |
| 2004/0046789 | A1 * | 3/2004 | Inanoria | 345/748 |
| 2005/0125432 | A1 * | 6/2005 | Lin et al. | 707/101 |
| 2005/0193331 | A1 * | 9/2005 | Grambihler et al. | 715/513 |
| 2006/0248507 | A1 * | 11/2006 | Benjes | G06F 8/24 717/108 |
| 2007/0055676 | A1 * | 3/2007 | Kim | G06F 9/465 1/1 |
| 2007/0136364 | A1 * | 6/2007 | Mejia et al. | 707/103 R |
| 2007/0288887 | A1 * | 12/2007 | Pepin | G06F 8/24 717/105 |

(Continued)

OTHER PUBLICATIONS

Pedro A Szekely et al., "Declarative interface models for user interface construction tools: the MASTERMIND approach", [Online], 1995, pp. 1-27, [Retrieved from Internet on Sep. 24, 2015], <http://www.researchgate.net/profile/Pedro_Szekely/publication/220781012>.*
M. Bugliesi, "A Declarative View of Inheritance in Logic Programming", [Online], 1992, pp. 1-15, [Retrieved from Internet on Sep. 24, 2015], <http://www.dais.unive.it/~michele/Papers/jicslp92.pdf>.*

(Continued)

*Primary Examiner* — Thuy Dao
*Assistant Examiner* — Ziaul A Chowdhury
(74) *Attorney, Agent, or Firm* — Sterne, Kessler, Goldstein & Fox PLLC

(57) ABSTRACT

Object inheritance is a programming feature that allows developers to designate a programming object as a "descendent" of one or more "ancestors." Disclosed herein are system, method, and computer program product embodiments for supporting inheritance in a programming language. In an embodiment, a first programming object is received from a first document, inheritance information about the first programming object is received and analyzed, a second programming object based on the first programming object and the inheritance information is created, the second programming object is sent to an editor for editing, a third programming object is received from the editor, a fourth programming object based on the first or second programming object, the third programming object, and the inheritance information is created, and the fourth programming object is stored in a second document.

17 Claims, 9 Drawing Sheets

(56) References Cited

U.S. PATENT DOCUMENTS

| | | | | |
|---|---|---|---|---|
| 2008/0256465 | A1* | 10/2008 | Gasperini | G06F 8/24 715/762 |
| 2008/0276227 | A1* | 11/2008 | Greifeneder | 717/130 |
| 2009/0199156 | A1* | 8/2009 | Li et al. | 717/104 |
| 2009/0217302 | A1* | 8/2009 | Grechanik et al. | 719/320 |
| 2010/0146482 | A1* | 6/2010 | Holtz | G06F 9/4433 717/116 |
| 2011/0126170 | A1* | 5/2011 | Psenka | 717/108 |

OTHER PUBLICATIONS

Moises Lejter et al., "Support for Maintaining Object-Oriented Programas", [Online] 1992, pp. 1045-1052, [Retrieved from Internet on Sep. 24, 2015], <http://ieeexplore.ieee.org/stamp/stamp.jsp?tp=&arnumber=184759>.*

Erik Meijer et al., "Static Typing Where Possible, Dynamic Typing When Needed: The End of the Cold War Between Programming Languages", [Online], 2005, pp. 1-5, [Retrieved from Internet on Sep. 24, 2015], <http://citeseerx.ist.psu.edu/viewdoc/download-?doi=10.1.1.394.3818&rep=rep1&type=pdf>.*

* cited by examiner

ADDING INHERITANCE SUPPORT TO A COMPUTER PROGRAMMING LANGUAGE

FIELD OF THE INVENTION

The present invention relates to object inheritance and computer programming languages.

BACKGROUND OF THE INVENTION

Computer programmers have long relied upon object inheritance ("inheritance") to add versatility to object-oriented programming languages, e.g., computer languages that use programming objects. While inheritance has been available in programming languages since the 1960's, many modern programming languages, especially declarative programming languages, do not natively support this feature. Examples of declarative programming languages that do not currently offer inheritance are EXTENSIBLE APPLICATION MARKUP LANGUAGE (XAML) and SILVERLIGHT by Microsoft, Inc. of Redmond, Wash. Many programmers use the Microsoft Windows Presentation Foundation (WPF) Designer to manipulate XAML objects, and adding inheritance support to the WPF Designer would have many significant benefits for program development. Object inheritance can have the benefit to the application developer of a more efficient, richer, rapid application development (RAD) environment via object-oriented programming (OOP) techniques and "code reuse."

Therefore, improved systems, methods and computer program products are needed to add inheritance to computer programming languages.

BRIEF SUMMARY

Embodiments of the present invention relate to object inheritance and programming languages. Specifically, an embodiment provides a method and system of providing inheritance to a programming language. The method begins by receiving a first programming object from a first document. Inheritance information about the first programming object is received from a second file, and the inheritance information is analyzed. A second programming object is created based on the first programming object and the inheritance information, and the second object is sent to an editor for editing. A third programming object is received from the editor, where the third programming object was created by editing the second programming object. A fourth programming object based on the first or second programming object, the third programming object and the inheritance information is created and stored in a second document.

Another embodiment includes a system for providing inheritance to a programming language. The system includes a first storage, the first storage containing inheritance information about a programming object, and an inheritance module. The inheritance module is configured to, upon receiving an indication that an editor has been directed to load a first programming object from a second storage, receive inheritance information from the first storage. A second programming object is created based on the first programming object, the second programming object, and the inheritance information. The second programming object is sent to the editor for editing. The inheritance module receives a third programming object from the editor, the third programming object being created by editing the second programming object using the editor. Finally, the inheritance module is configured to create a fourth programming object based on the first or second programming object, the third programming object and the inheritance information, and store the fourth programming object in the second storage. Further features and advantages, as well as the structure and operation of various embodiments are described in detail below with reference to the accompanying drawings.

BRIEF DESCRIPTION OF THE FIGURES

Embodiments of the invention are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION OF EMBODIMENTS

The present invention relates to adding inheritance support to a programming language. While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility. The following sections describe a system, method and computer program product for adding inheritance support to a programming language in greater detail.

Overview

Some embodiments described herein provide object inheritance support to a programming language. According to an embodiment, inheritance or "support for inheritance" is added or "overlaid" onto a programming language for which the feature has not yet been implemented or is not native to the programming language.

As would be known to persons having skill in the art, as used herein in some embodiments, object inheritance, e.g., support for inheritance, is a programming feature that allows developers to designate a programming object, e.g., an object, a software object, as a "descendent" of one or more "ancestors." In an embodiment of object inheritance, object descendants can have inherited ancestor properties that can be edited by adding extensions to the inherited ancestor properties and by overriding the ancestor properties, such changes being persisted for future editing. In an embodiment, if the ancestor is then modified, all of its descendants will automatically receive the inherited changes.

System

Figure 1A:
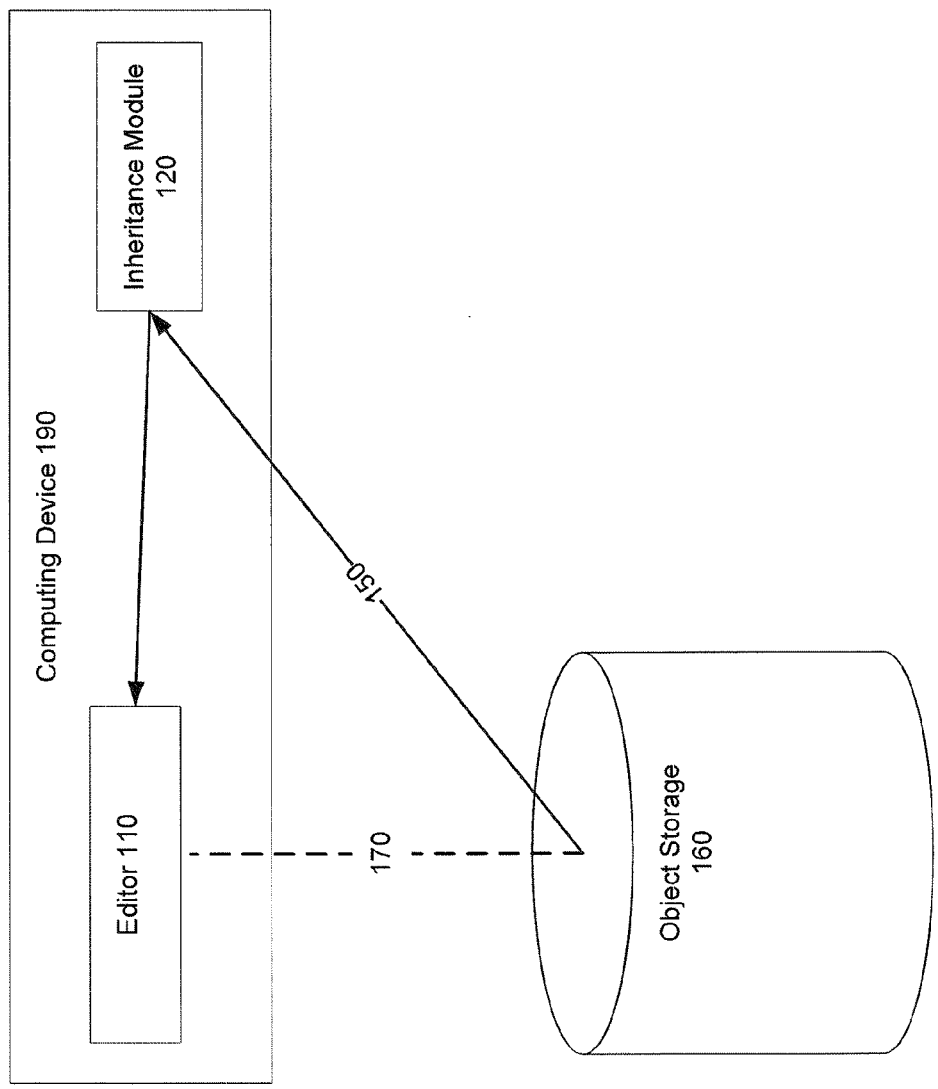
FIG. 1A depicts a system for loading program objects into an inheritance module according to an embodiment of the invention.
Figure 1B:
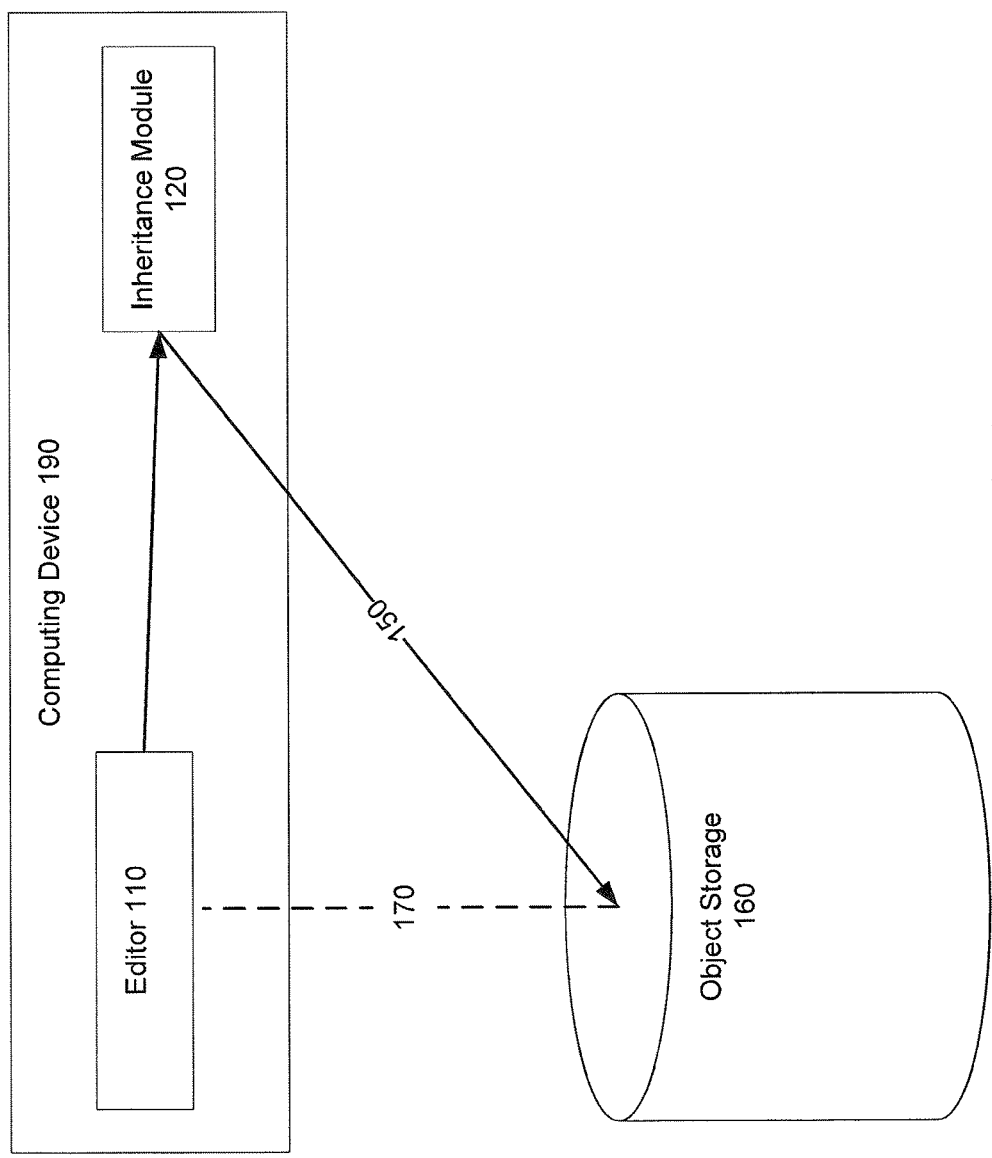
FIG. 1B depicts a system for saving program objects from an inheritance module according to an embodiment of the invention.

FIGS. 1A-1B depict system 100, according to an embodiment, to provide object inheritance to a programming language. System 100 includes computing device 190 and object storage 160. Computing device 190 includes editor 110 and inheritance module 120.

Generally speaking, in an embodiment, the "overlay" of inheritance support onto an existing programming language where it is unsupported, is accomplished by having inheritance module 120 interface with an editor 110 that is enabled to edit the programming language objects. As used herein, a programming language object may also be termed a programming object, an object, a document, a file-system file, a file, or other similar terms. Embodiments herein can work in a classic file-based storage/repository system, as well as with other types of systems.

According to an embodiment, editor 110 is an editor or "designer" used by programmers to develop applications, and inheritance module 120 works or interfaces with editor 110 to provide inheritance to the programming language. In embodiments, editor 110, and the underlying programming language are not changed to incorporate the inheritance feature. Rather, inheritance module 120 works within the "rules" of editor 110 and the programming language to provide the feature.

An embodiment of this approach also supports "multi-level inheritance", where a descendant can have a lineage of ancestors which are merged in succession, and "nested" inheritance, where a descendant object can be nested within a descendant Window or another descendant object, by utilizing a recursive algorithm technique.

One non-limiting example of an editor 110 that works with embodiments of the invention, is the Microsoft WPF Designer noted above, and an example of the programming language is the XAML declarative programming language. Because XAML is a language for describing visual aspects of a computer program, the inheritance provided by embodiments to the XAML programming language is termed "visual inheritance." An example of a rule followed by embodiments that WPF Designer requires when editing XAML, is that objects be loaded and stored in an object storage location, e.g., object storage 160.

Other non-limiting examples of programming languages with which techniques described in embodiments herein can be used include other declarative markup languages, such as XHTML5, and HTML5. Many examples listed herein, use XAML, but this example is intended to be non-limiting. Because XAML, as a declarative programming language based on Extensible Markup Language can be stored and edited in "plain text" mode, examples used herein may be easily examined without converting from more encoded formats, e.g., binary instructions or machine language. One having skill in the art will understand, that embodiments implementing the features noted herein may be implemented using a range of different programming languages.

Continuing the general description of an embodiment, for each programming object document edited by editor 110, inheritance module 120 retrieves or "intercepts" 150 the document and automatically creates a replacement inheritance supported object for editing by editor 110. As detailed further below with the discussion of FIG. 3, instead of editor 110 directly loading 170 a programming object, inheritance module 120 receives the object.

As further discussed below, this editing version of the programming object is created in an embodiment by selectively "merging," according to rules of inheritance, the object document with each of its ancestors, and its ancestors ancestors, etc. This merging is performed whenever a particular object document is loaded at design-time and again at build (compile) time.

In FIG. 1B, an embodiment of a system 101 is depicted that allows edited versions of inheritance supported objects to be saved in object storage 160. To save 170 the merged object document, the merged ancestor and descendant objects are first sent from editor 110 to inheritance module 120 where they are separated into their component parts using rules of inheritance, and then saved 150 in object storage 160. This separation command is detailed below with the discussion of FIG. 4.

A non-limiting example integrated development environment (IDE) that has aspects of embodiments described herein is POWERBUILDER, available from Sybase, Inc. of Dublin, Calif. In an embodiment, PowerBuilder provides aspects of embodiments by having a custom designer based on an extension of the Microsoft WPF Designer, hosted in a custom integrated development environment (IDE) based on the VISUAL STUDIO ISOLATED SHELL from Microsoft, Inc. An embodiment enables the development of PowerBuilder WPF applications having object inheritance features described herein. According to an embodiment described herein, code developers using PowerBuilder have the extra capability to inherit from, extend, and edit WPF Windows and Standard and Custom visual User Objects (CVUOs) based on Microsoft WPF controls.

In an embodiment that uses XAML, the above described merging must be performed whenever descendant XAML is loaded. In an embodiment implemented in PowerBuilder, this loading occurs at compile-time and also at design-time to offer a "what you see is what you get (WYSIWG)" rendering in the PowerBuilder Window and User Object painters. In an embodiment, PowerBuilder supports multilevel inheritance, and all XAML ancestor levels are merged into a particular descendant at object loading time, and separated again at save time.

Loading the Object for Editing

FIGS. 2A-G depict representations of example programming objects, and illustrates inheritance according to embodiments. Various concepts associated with object oriented programming and visual programmatic design are discussed in this example, and one having skill in the art will appreciate the different concepts and their relationship to other embodiments.

Figure 2:
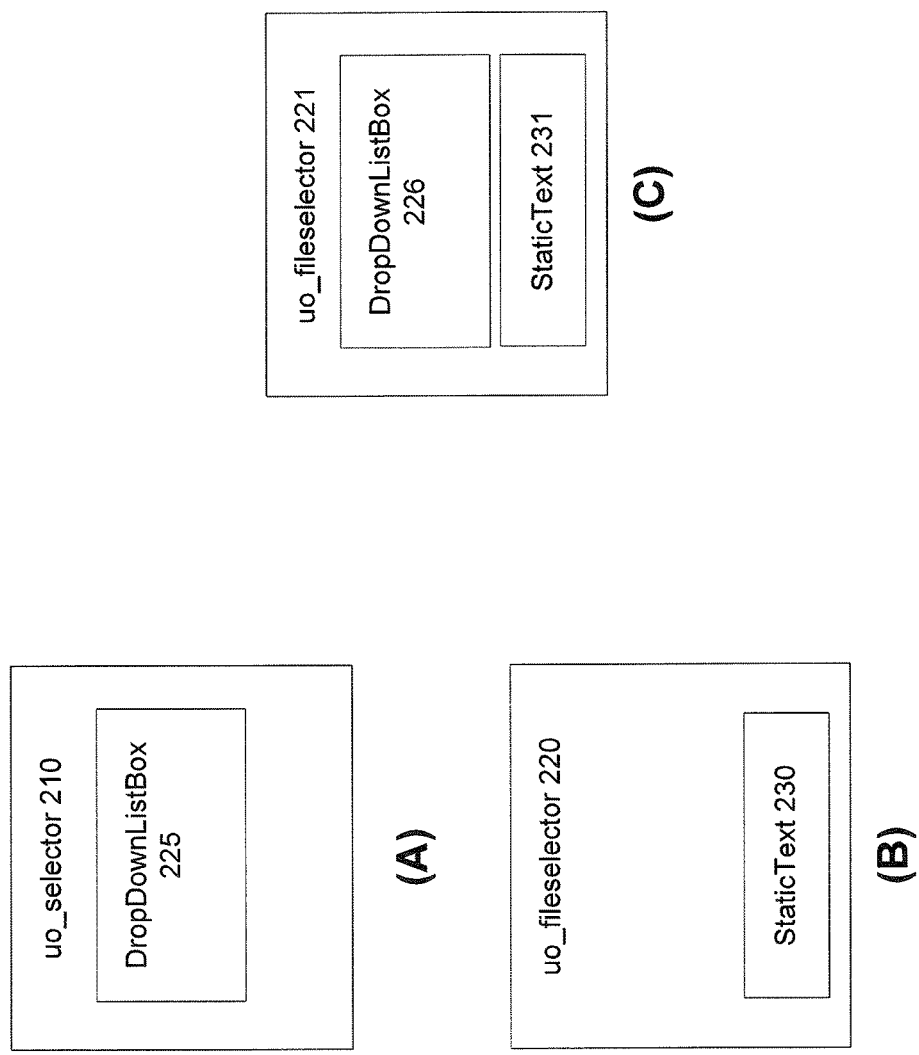
FIGS. 2A-E depict software objects and inheritance according to an embodiment of the invention.
Figure 2:
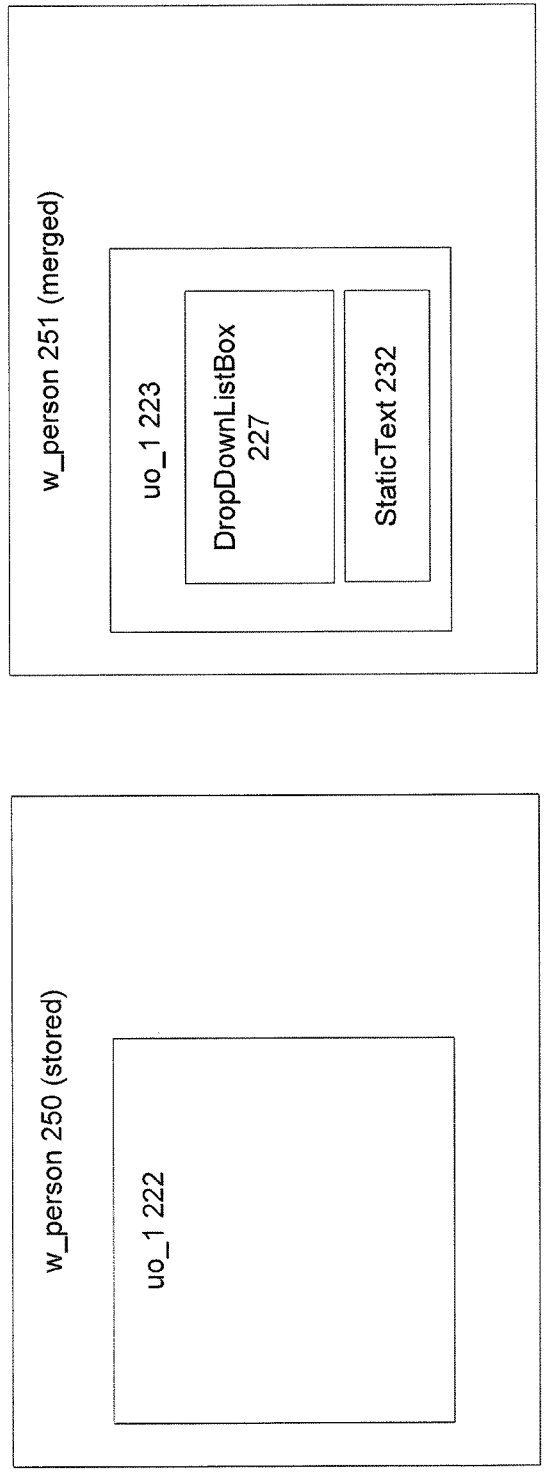

In an example depicted on FIG. 2A, object "uo_selector" 210 is a programming object that contains a "list box" graphical control. In an example variation of this example, uo_selector 210 is a XAML Custom Visual User Object (CVUO) implemented in PowerBuilder, containing a DropDownListBox 225 control and having code listed below in Code Selection #1 (CS1).

---

CS1 - Custom Visual User Object (CVUO) - "uo_selector"

```
<pbwpf:UserObject x:Class="uo_selector"
        xmlns="http://schemas.microsoft.com/winfx/2006/xaml/presentation"
        xmlns:x="http://schemas.microsoft.com/winfx/2006/xaml"
        xmlns:pbwpf ="clr-
```

| CS1 - Custom Visual User Object (CVUO) - "uo_selector" |
|---|
| namespace:Sybase.PowerBuilder...;assembly=Sybase.PowerBuilder..."<br>    PBHeight="680" PBWidth="1500" Height="170" Width="328"><br>      <Canvas><br>           <pbwpf:DropDownListBox Name="ddlb_1" X="256" Y="308" PBWidth="1125"<br>               PBHeight="400" TabOrder="10" FaceName="Tahoma" TextColor="Window<br>               Text" BorderStyle="stylelowered" /><br>    </Canvas><br></pbwpf:UserObject> |

It should be noted that the XAML shown in CS1, as with all the Code Selections shown herein, follows a standard Document Object Model (DOM) convention for representing declarative programming languages, such as XML. As is discussed below, some embodiments described herein use the DOM convention to analyze and manipulate programming objects, using nodes, elements, tags and attributes. Code terminology C1-C3 below is used in some embodiments herein and defined with respect to the following code sample. These terms follow the Document Object Model (DOM Model), a convention used with declarative programming languages.

```
<pbwpf:StaticText Name="st_1" X="256" Y="148" PBWidth="599"
    PBHeight="100" Weight="700" FaceName="System"
    TextColor="Window Text" BackColor="Button Face" Text="Select
    a file:" FocusRectangle="false" />
```

C1. Node: In the example above, the entire set of code from "<" to "/>" is termed a node.
C2. Tag: In the example above, the tag name or tag of the node is "StaticText."
C3. Attribute: In the example above, the attributes or properties of the node are, for example, "X", "Y", "PBWidth". Each attribute generally has a value, e.g., as shown above: X="256".

The conventions C1-C3 noted above are offered as a non-limiting examples of definitions associated with terms used herein. One having skill in the art will recognize these terms and their use in a DOM system.

Returning to FIG. 2A and CS1, the example object uo_selector 210, in this example, is not derivative, e.g., it does not inherit any elements, nor does it contain any user objects, and as such, is traditional, non-inheritance having XAML.

Depicted on FIG. 2B, another example object, uo_fileselector 220, is also a programming object. According to an embodiment, uo_fileselector 220 also has a list box control, having code listed below in Code Selection #2 (CS2).

In this example, uo_fileselector 220 inherits attributes from uo_selector 210. In a variation of this example, uo_fileselector 220 is a XAML CVUO, that inherits elements from the XAML variation of uo_selector 210 above.

It should be noted that, because of the inheritance, nether the DropDownListBox 225 control nor the root element sizing attributes (PBHeight="680" PBWidth="1500" Height="170" Width="328") appear in the CS2 example code. In the example embodiment, these elements are inherited from the CS1 example code of uo_selector 210. It should also be noted that, in the CS2 example, a StaticText 230 control has been added. As would be appreciated by one skilled in the art, by object inheritance, this added control "extends" the "ancestor" uo_selector 210 object.

The example code as listed at CS2, because of the inheritance upon which it relies, without an embodiment, cannot be edited in traditional XML/XAML editors. These traditional XAML editors cannot load, display and allow editing of uo_fileselector 220 with its inherited attributes. An embodiment described herein enables these traditional XML/XAML editors to edit uo_fileselector 220 without any modification to the traditional XML/XAML editing tools, e.g., editor 110.

Figure 3:
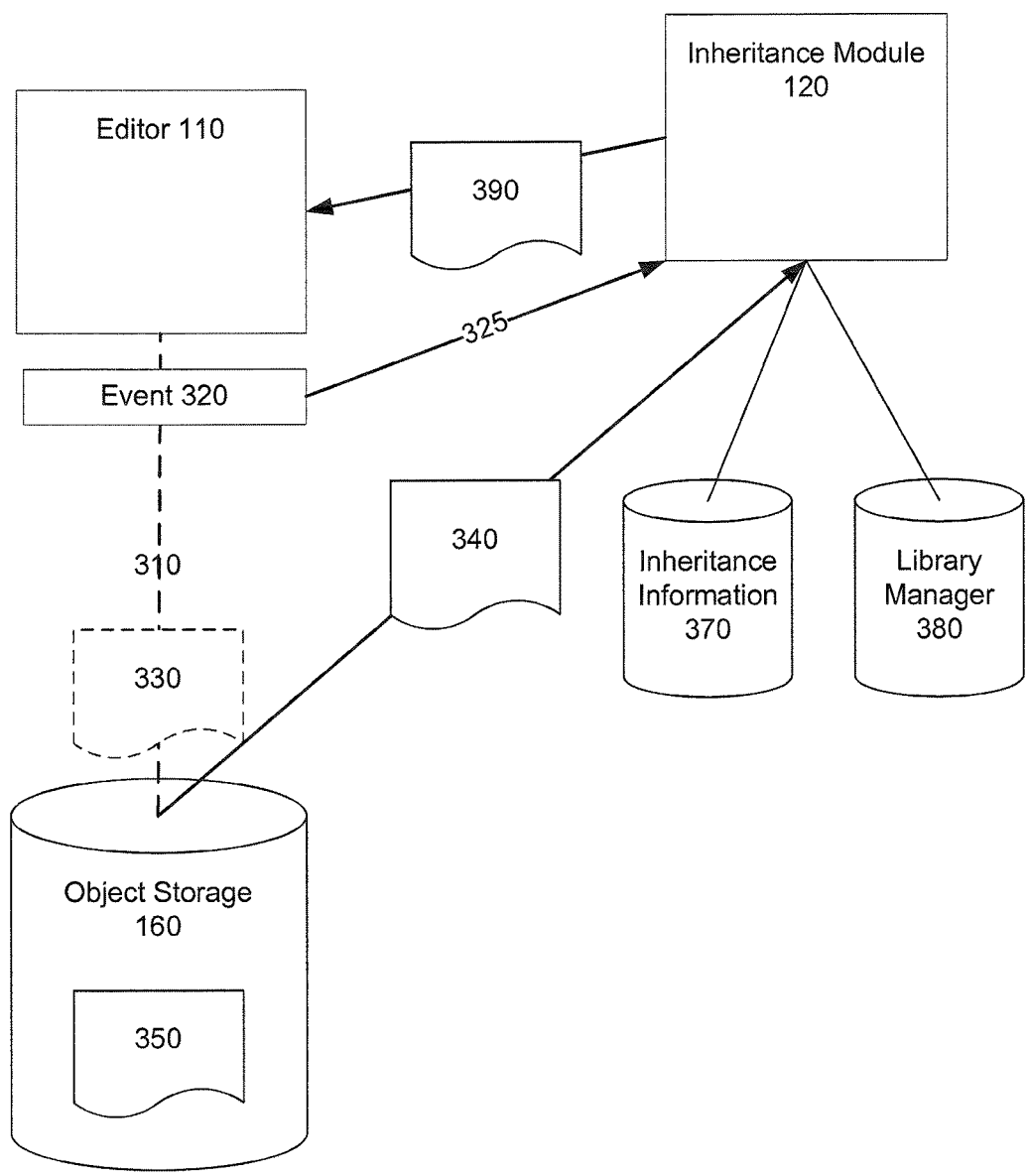
FIG. 3 depicts a more detailed view of a system for loading program objects into an inheritance module according to an embodiment of the invention.

FIG. 3 depicts a system 300, according to an embodiment, whereby uo_fileselector 220, having inherited attributes, and processed by an embodiment, can be edited by editor 110. Continuing the example, a user directs editor 110, using connection 310 to object storage 160, to load uo_fileselector 220 (shown stored as file 350) for editing in editor 110. File 330 depicts the path of uo_fileselector 220 as loaded directly via connection 310.

According to an embodiment, during the process of loading, editor 110 triggers event 320, such event corresponding to the loading of a programming object. Connection 325 depicts inheritance module 120 receiving notice of this event. As would be appreciated by one skilled in the art, embodiments of inheritance module 120 can subscribe to the events from editor 110, and receive this notification.

| CS2 - CVUO "uo_fileselector," inheriting from "uo_selector" |
|---|
| <pbwpf:UserObject x:Class="uo_fileselector"<br>       xmlns="http://schemas.microsoft.com/winfx/2006/xaml/presentation"<br>       xmlns:x="http://schemas.microsoft.com/winfx/2006/xaml"<br>       xmlns:pbwpf="clr-<br>namespace:Sybase.PowerBuilder...;assembly=Sybase.PowerBuilder..."><br>    <Canvas><br>           <pbwpf:StaticText Name="st_1" X="256" Y="148" PBWidth="599"<br>               PBHeight="100" Weight="700" FaceName="System" TextColor="Window<br>               Text" BackColor="Button Face" Text="Select a file:"<br>               FocusRectangle="false" /><br>    </Canvas><br></pbwpf:UserObject> |

According to an embodiment, upon receipt of event 320, inheritance module 120 reroutes the loading of file 350 (e.g., uo_fileselector 220) to inheritance module 120. In another embodiment, this rerouting can route file 350 to a different location for processing according to embodiments as well.

In an embodiment, the alternative routing processes described above do not always occur. This determination of whether inheritance is used by an object at load time, and thus whether to route the file to inheritance module, in an embodiment is performed at the inheritance module 120. In another embodiment, event 320 contains information concerning the inheritance requirements of the object to be loaded, and inheritance module 120 is set to receive this information with the event notification. As would be appreciated by one skill in the art, other ways of filtering which objects are handled by some embodiments can be handled in various ways.

Once file 340 (rerouted uo_fileselector 220) is received by inheritance module 120, in an embodiment, the "merge" steps described below are performed. To enable editor 110 to load, view and edit uo_fileselector 220 with its inherited attributes described above, in an embodiment, inheritance module 120 performs the steps below.

cross-references the inheritance information associated with an object from inheritance information 370 with ancestor objects available from object storage 160. In an embodiment, a referenced ancestor object may be located in object storage 160 by reference to library manager 380. According to an embodiment, library manager 380 can provide a physical storage location for each ancestor object of the programming project. In this example, uo_selector 210, referenced in the inheritance information 370 retrieved for uo_fileselector 220, is located and retrieved using information from library manager 380. In another embodiment, inheritance information 370 and library manager 380 are stored in the same physical device, and in another embodiment, the respective inheritance and library information are stored in a single data structure, e.g., database.

Referring to FIG. 2C, once uo_selector 210 has been retrieved, in this example, both code CS1 and CS2 are available for processing by inheritance module 120. Code selection #3 (CS3) lists, according to an embodiment, the result of a "merge" command performed by an embodiment, also known as "merge on load."

---

CS3 - CVUO "uo_fileselector," Merged with "uo_selector"

```
<pbwpf:UserObject x:Class="uo_fileselector"
        xmlns="http://schemas.microsoft.com/winfx/2006/xaml/presentation"
        xmlns:x="http://schemas.microsoft.com/winfx/2006/xaml"
        xmlns:pbwpf="clr-
namespace:Sybase.PowerBuilder...;assembly=Sybase.PowerBuilder..."
        PBHeight="680" PBWidth="1500" Height="170" Width="328">
    <Canvas>
            <pbwpf:DropDownListBox Name="ddlb_1" X="256" Y="308" PBWidth="1125"
                    PBHeight="400" TabOrder="10" FaceName="Tahoma" TextColor="Window
                    Text" BorderStyle="stylelowered" />
            <pbwpf:StaticText Name="st_1" X="256" Y="148" PBWidth="599"
                    PBHeight="100" Weight="700" FaceName="System" TextColor="Window
                    Text" BackColor="Button Face" Text="Select a file:"
                    FocusRectangle="false" />
    </Canvas>
</pbwpf:UserObject>
```

---

Upon commencement of the merge function, inheritance module 120 retrieves stored inheritance data for uo_fileselector 220 from inheritance information 370. In an embodiment, this stored inheritance data includes a reference to uo_selector 210—the only place that this inheritance reference appears. In an embodiment, it is only inheritance information 370 that contains information regarding the ancestors of an object—no information is stored in the objects themselves. In a variation of the example, uo_selector 210 as an XAML object edited by an embodiment using PowerBuilder has "script metadata" that stores inheritance information 370.

Using this inheritance data, in an embodiment, inheritance module 120 retrieves the uo_selector 210 object for further processing. To accomplish this retrieval, an embodiment It should be noted that, in CS3 above, both DropDownListBox 226 and root element sizing attributes appear in CS3 from CS1, as well as StaticText 231 from CS2. In the example depicted, both the nodes (DropDownListBox 226 and StaticText 231) and the elements (PBHeight="680" PBWidth="1500," for example) have been merged or combined by inheritance module 120.

Multi-Level Inheritance

FIGS. 2D-E depict two programming objects that represent multilevel inheritance according to an embodiment. Object w_person 250 is an embodiment of a XAML window object having an instance of CVUO uo_fileselector 220 named "uo_1 222." An example of a code listing for w_person 250 is found at Code Selection #4 (CS4) below.

---

CS4 - Window "w_person"

```
<pbwpf:Window x:Class="w_person"
        xmlns="http://schemas.microsoft.com/winfx/2006/xaml/presentation"
        xmlns:x="http://schemas.microsoft.com/winfx/2006/xaml"
        xmlns:pbwpf="clr-
namespace:Sybase.PowerBuilder...;assembly=Sybase.PowerBuilder..."
        TitleBar="true" PBTitle="Person Data" MenuName="m_person">
    <Canvas>
            <pbwpf:UserObject Name="uo_1" X="5" Y="5" />
            <pbwpf:CommandButton Name="cb_open" X="1755" Y="312" PBWidth="402"
```

| CS4 - Window "w_person" |
| --- |
| ```
            PBHeight="112" TabOrder="20 " FaceName="Tahoma" Text="Open Person"
            />
          <pbwpf:MultiLineEdit Name="mle_1" X="261" Y="688" PBWidth="1893"
            PBHeight="700" TabOrder="30" FaceName="Tahoma" TextColor="Window
            Text" Text="none" BorderStyle="stylelowered" />
          <pbwpf:CommandButton Name="cb_exit" X="1751" Y="1492" PBWidth="402"
            PBHeight="112" TabOrder="40" FaceName="Tahoma" Text="Exit" />
    </Canvas>
</pbwpf:Window>
``` |

CS4, according to an embodiment, lists the unmerged, stored (e.g., file 350) version of the inheritance enabled code as described above. It should be noted that uo_1 222 is an instance of uo_fileselector 220, and as such inherits properties from that object. In this example, the attributes "X=5, Y=5" denote attributes that override those inherited from ancestor uo_fileselector 220. It should also be noted that in this example, ancestor uo_fileselector 220 inherits properties from ancestor uo_selector 210. Thus w_person 250, according to an embodiment, is an example of multilevel inheritance.

ate code objects into a merged object for editing. Described below, are embodiments that perform these functions using different approaches. In the non-limiting examples discussed below, the objects follow the DOM convention, and are XAML programming objects. One having skill in the art would recognize that the techniques and algorithms described below can be applied beyond the specifics of the examples noted. For the purposes of this section, the programming object to be edited, for example file 340, is termed the descendant.

| CS5 - Window "w_person" |
| --- |
| ```
<pbwpf:Window x:Class="w_person"
        xmlns="http://schemas.microsoft.com/winfx/2006/xaml/presentation"
        xmlns:x="http://schemas.microsoft.com/winfx/2006/xaml"
        xmlns:pbwpf="clr-
namespace:Sybase.PowerBuilder...;assembly=Sybase.PowerBuilder..."
    TitleBar="true" PBTitle="Person Data" MenuName="m_person">
    <Canvas>
        <pbwpf:UserObject Name="uo_1" X="5" Y="5" PBHeight="680"
            PBWidth="1500" Height="170" Width="328">
            <Canvas>
                <pbwpf:DropDownListBox Name="ddlb_1" X="256" Y="308"
                    PBWidth="1125" PBHeight="400" TabOrder="10"
                    FaceName="Tahoma" TextColor="Window Text"
                    BorderStyle="stylelowered" />
                <pbwpf:StaticText Name="st_1" X="256" Y="148"
                    PBWidth="599" PBHeight="100" Weight="700"
                    FaceName="System" TextColor="Window Text"
                    BackColor="Button Face" Text="Select a file:"
                    FocusRectangle="false" />
            </Canvas>
        </pbwpf:UserObject>
        <pbwpf:CommandButton Name="cb_open" X="1755" Y="312" PBWidth="402"
            PBHeight="112" TabOrder="20" FaceName="Tahoma" Text="Open Person"
            />
        <pbwpf:MultiLineEdit Name="mle_1" X="261" Y="688" PBWidth="1893"
            PBHeight="700" TabOrder="30" FaceName="Tahoma" TextColor="Window
            Text" Text="none" BorderStyle="stylelowered" />
        <pbwpf:CommandButton Name="cb_exit" X="1751" Y="1492" PBWidth="402"
            PBHeight="112" TabOrder="40" FaceName="Tahoma" Text="Exit" />
    </Canvas>
</pbwpf:Window>
``` |

Multilevel inheritance is illustrated in the example shown above in CS5, by the emboldened portion listing the merged uo_1 223 object (lines 8-19). In this example, the merged uo_1 223 portion includes elements inherited from a first ancestor (StaticText 230 from uo_fileselector 220) and a second ancestor (DropDownListBox 225 from uo_selector 210), as well as the overridden attributes (X="5" Y="5") noted above.

The Merging Process

As noted above, some embodiments herein offer support for single level and multilevel inheritance by merging dispar- Identifying and Loading Ancestors After being loaded into inheritance module 120, descendant is first parsed to determine its included nodes. In Code Selection #6 (CS6) below, for example, the nodes include: UserObject, Canvas and StaticText. This analysis is performed recursively on the hierarchical structure, with each branch, sub-branch and sub-sub branch, etc., being recursively analyzed.

| CS6 - Window "uo_fileselector" |
| --- |
| ```
<pbwpf:UserObject x:Class="uo_fileselector"
        xmlns="http://schemas.microsoft.com/winfx/2006/xaml/presentation"
        xmlns:x="http://schemas.microsoft.com/winfx/2006/xaml"
        xmlns:pbwpf="clr-
namespace:Sybase.PowerBuilder...;assembly=Sybase.PowerBuilder...">
    <Canvas>
            <pbwpf:StaticText Name="st_1" X="256" Y="148" PBWidth="599"
                PBHeight="100" Weight="700" FaceName=" System" TextColor="Window
                Text" BackColor="Button Face" Text="Select a file:"
                FocusRectangle="false" />
    </Canvas>
</pbwpf:UserObject>
``` |

In this example embodiment, nodes that are marked with "UserObject" are subject to inheritance processing, e.g., they can have nodes and attributes of nodes inherited from associated ancestors. In another embodiment other types of nodes are also subject to inheritance.

Once a node is identified as subject to inheritance, referring to FIG. 3, an inquiry is made to inheritance information 370 to retrieve the names of ancestor objects associated with the descendent object. As noted above, a XAML variation of the example discussed in this section, inheritance information 370 is also known as "script metadata," especially in PowerBuilder.

Once the names of the ancestor objects of the descendent are identified, the specific file locations of the ancestors are received from library manager 380, and the objects are loaded into memory. In an XAML variation of the example discussed in this section, library manager 380 is also known "LibraryManager," especially in PowerBuilder.

tors must be identified and loaded for further processing. The process is continued until all ancestors related to a descendent are loaded in memory for processing.

Merging Nodes and Attributes of Ancestors

In an embodiment, once all of the ancestors of an object are identified and loaded, the attributes of each ancestor node are merged in succession while iterating up the hierarchy of nodes. As would be appreciated by one having skill in the art, descendant overrides of attribute values take precedence over ancestors farther up the hierarchy. In another embodiment, inheritance module 120 can perform a degree of the merge steps described herein in parallel—not waiting until any one group of activities is completed.

In an embodiment, after the above noted attribute merger, any child nodes identified in ancestors that are not found in the descendent are added to the descendent. As would be appreciated by one having skill in the art, this process repre-

| CS7 - Custom Visual User Object (CVUO) - "uo_selector" |
| --- |
| ```
<pbwpf:UserObject x:Class="uo_selector"
        xmlns="http://schemas.microsoft.com/winfx/2006/xaml/presentation"
        xmlns:x="http://schemas.microsoft.com/winfx/2006/xaml"
        xmlns:pbwpf="clr-
namespace:Sybase.PowerBuilder...;assembly=Sybase.PowerBuilder..."
    PBHeight="680" PBWidth="1500" Height="170" Width="328">
    <Canvas>
            <pbwpf:DropDownListBox Name="ddlb_1" X="256" Y="308" PBWidth="1125"
                PBHeight="400" TabOrder="10" FaceName="Tahoma" TextColor="Window
                Text" BorderStyle="stylelowered" />
    </Canvas>
</pbwpf:UserObject>
``` |

The code object listed in CS7 above is an ancestor of the code object listed in CS6. This inheritance relationship, in an example, was retrieved from inheritance information 370 during the merging process.

Once the ancestor object, e.g., CS7 is loaded, the "Identifying and Loading Ancestors" process described above of identifying nodes, retrieving inheritance information 370, and retrieving objects based on library manager 380 locations, is performed for each of the identified ancestor objects. In an embodiment that implements multilevel inheritance, an identified and loaded ancestor node, e.g., CS7, can itself inherit from an ancestor node, and these ancestors of ancessents nested object extension in the merging process. Using the examples of CS6 and CS7 above, merged into CS8 below, upon merger, the DropDownListBox 225 node of CS7 is identified as a node that is missing in the descendent listed in CS6.

To merge all ancestor child nodes into the descendant, this function loops through the child nodes of each loaded ancestor, and for each identified node, loops through all the descendant's child nodes looking for a match. If no match is found anywhere in the descendent, the node is copied into the resulting merged object.

| CS8 - "uo_fileselector," Merged with "uo_selector" |
| --- |
| ```
<pbwpf:UserObject x:Class="uo_fileselector"
        xmlns="http://schemas.microsoft.com/winfx/2006/xaml/presentation"
        xmlns:x="http://schemas.microsoft.com/winfx/2006/xaml"
        xmlns:pbwpf="clr-
``` |

| CS8 - "uo_fileselector," Merged with "uo_selector" |
|---|

```
namespace:Sybase.PowerBuilder...;assembly=Sybase.PowerBuilder..."
    PBHeight="680" PBWidth="1500" Height="170" Width="328">
    <Canvas>
        <pbwpf:DropDownListBox Name="ddlb_1" X="256" Y="308" PBWidth="1125"
            PBHeight="400" TabOrder="10" FaceName="Tahoma" TextColor="Window
            Text" BorderStyle="stylelowered" />
        <pbwpf:StaticText Name="st_1" X="256" Y="148" PBWidth="599"
            PBHeight="100" Weight="700" FaceName="System" TextColor="Window
            Text" BackColor="Button Face" Text="Select a file:"
            FocusRectangle="false" />
    </Canvas>
</pbwpf:UserObject>
```

The merging embodiment steps outlined above are intended to be illustrative and non-limiting. Steps described may be performed in a different order, use different techniques and have different results without departing from the spirit of embodiments described herein.

Editing the Object

Figure 4:
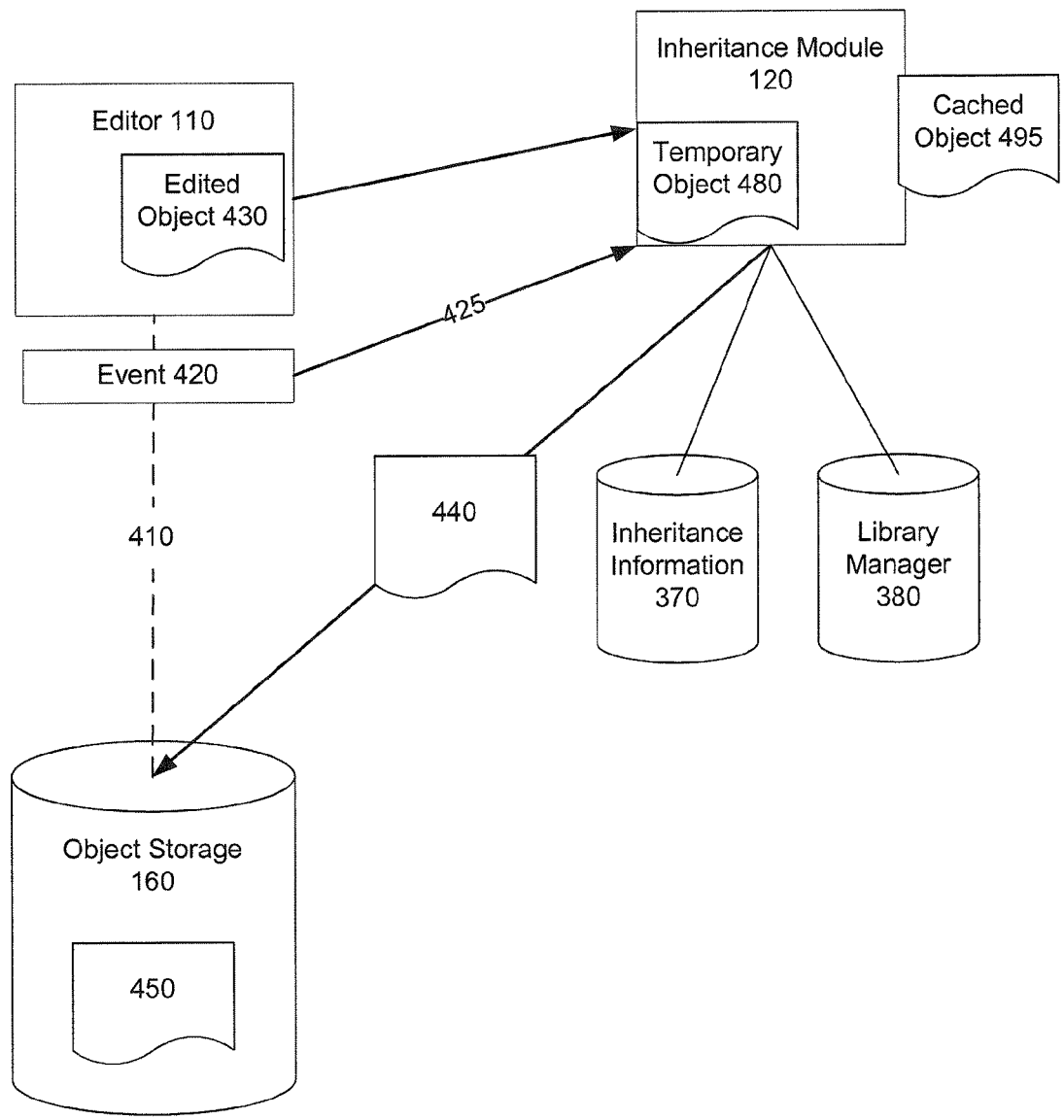
FIG. 4 depicts a more detailed view of a system for saving program objects from an inheritance module according to an embodiment of the invention.

In FIG. 4, in an embodiment of inheritance module, the merged code, e.g., CS8 is represented by file 440, and this file 440, are relayed to editor 110 for editing. In embodiments, as discussed below, each version of file 440, during its transition to file 450, can be stored for further processing in system 100.

In an embodiment, this delivery of file 440 to Editor 110 represents the alternative completion of the traditional load command noted earlier. In this example, file 440, as a merged version of uo_fileselector 220 that expressly includes each inherited element, is able, in an embodiment, to be edited by traditional Editor 110. In an embodiment, to enable the separate command, discussed below, a copy of the pre-edited, merged file is stored as cached object 495.

FIG. 4 depicts the steps taken, by some embodiments, to save changes made to file 450. Code Selection #7 (CS7) lists one type of example modification of uo_fileselector 220. In the CS4 example, an attribute of StaticText 230 has been changed: Text="Select a file:" has been changed to Text="Select a New file:" In this example, because the change has been made to an attribute in the "StaticText" node, upon separation, the descendent code in CS8 will be changed. If, alternatively, the "DropDownListBox" node were changed, this node, being inherited from the CS9 code, would be added upon completion of the separate command to the CS8 code as an object extension.

As would be appreciated by one having skill in the art, in embodiments, following standard inheritance principles, other types of changes can be handled by the approaches described herein. The specifics of the separate command are discussed further below.

File 440, the change example described above, uo_fileselector 220, has changes to attributes, and cannot be saved in storage 160 without having the merged component parts separated. As would be appreciated by one having skill in the art, according to an embodiment, the merged, edited CS8 code version of uo_fileselector must be returned to its original separated inheritance format at saving, or inheritance will be broken. As would be appreciated by one having skill in the art, storing merged ancestor nodes in a descendent object causes the descendant to become "stale" and cause the descendent to not reflect future changes to inherited elements from the ancestor.

FIG. 4 depicts the process, used by an embodiment, to enable the saving of a modified object that has inheritance, e.g., CS9 above. According to an embodiment, during the process of saving, editor 110 triggers event 420, such event corresponding to the saving of an object supported by inheritance module 120. Connection 425 depicts inheritance module 120 receiving notice of this event.

In a step similar to those discussed above with FIG. 3, according to an embodiment, upon receipt of event 420, inheritance module 120 reroutes the saving of edited object 430 to inheritance module 120. In another embodiment, this rerouting can route edited object 430 to a different location for processing as well. Once edited object 430 (edited uo_fileselector 220) is received by inheritance module 120, in an embodiment, the "separate command," also known as "separate on save" is performed.

| CS9 - Edited, Merged "uo_fileselector" |
|---|

```
<pbwpf:UserObject x:Class="uo_fileselector"
    xmlns="http://schemas.microsoft.com/winfx/2006/xaml/presentation"
    xmlns:x="http://schemas.microsoft.com/winfx/2006/xaml"
    xmlns:pbwpf="clr-
namespace:Sybase.PowerBuilder...;assembly=Sybase.PowerBuilder..."
    PBHeight="680" PBWidth="1500" Height="170" Width="328">
    <Canvas>
        <pbwpf:DropDownListBox Name="ddlb_1" X="256" Y="308" PBWidth="1125"
            PBHeight="300" TabOrder="10" FaceName="Tahoma" TextColor="Window
            Text" BorderStyle="stylelowered" />
        <pbwpf:StaticText Name="st_1" X="256" Y="148" PBWidth="599"
            PBHeight="100" Weight="700" FaceName="System" TextColor="Window
            Text" BackColor="Button Face" Text="Select a New file:"
            FocusRectangle="false" />
    </Canvas>
</pbwpf:UserObject>
```

The Separate Command

In an embodiment, the separate process generally involves two steps: first analyzing the elements of the merged object document and second, identifying any changes to these elements. In an embodiment, changes are detected by recursively comparing each node in edited object 430 and cached object 495. In an embodiment, each attribute of each node of edited object 430 is compared to the respective node and attribute of cached object 495. In addition, for example, the insertion or deletion of nodes is also detected in edited object 430.

In an embodiment, once changes are detected in attributes, or nodes are determined to have been added or removed, the detected changes are written to temporary object 480 where the final version of the descendant document to be saved is built. In an embodiment, once the changes have all been determined and written to the cache, an embodiment saves temporary object 480 to file 450 in object storage 160.

To illustrate an embodiment of the separate command, the CS10 example below lists a type of modification of uo_fileselector 220. In the CS10 example, an attribute of the root UserObject node has been changed. The attribute "PBHeight=680" from the original uo_selector object 210 (CS7 above) has been changed to "PBHeight=800." As noted above in CS7 and CS8, this attribute is inherited from uo_selector 210 by uo_fileselector 220. As would be appreciated by one having skill in the art, this type of change is called an "override" or an "override of ancestor element" e.g., a changed attribute is overriding the previously inherited attribute value.

---

CS10 - Edited, Merged "uo_fileselector"

---

```
<pbwpf:UserObject x:Class="uo_fileselector"
        xmlns="http://schemas.microsoft.com/winfx/2006/xaml/presentation"
        xmlns:x="http://schemas.microsoft.com/winfx/2006/xaml"
        xmlns:pbwpf="clr-
namespace:Sybase.PowerBuilder...;assembly=Sybase.PowerBuilder..."
        PBHeight="800" PBWidth="1500" Height="170" Width="328">
    <Canvas>
            <pbwpf:DropDownListBox Name="ddlb_1" X="256" Y="308" PBWidth="1125"
                PBHeight="400" TabOrder="10" FaceName="Tahoma" TextColor="Window
                Text" BorderStyle="stylelowered" />
            <pbwpf:StaticText Name="st_1" X="256" Y="148" PBWidth="599"
                PBHeight="100" Weight="700" FaceName="System" TextColor="Window
                Text" BackColor="Button Face" Text="Select a file:"
                FocusRectangle="false" />
    </Canvas>
</pbwpf:UserObject>
```

---

During the separate command, in the CS10 example above, the noted change to the root of UserObject would be detected by inheritance module 120, and, because this attribute does not currently exist in the CS6 uo_fileselector 220 component, this PBHeight value will be an override to an ancestor attribute value. Thus, as listed CS11 below, in this example, the separated uo_fileselector will include "PBHeight=800" as an override attribute in the root element.

---

CS11 - Edited, Separated "uo_fileselector"

---

```
<pbwpf:UserObject x:Class="uo_fileselector"
        xmlns="http://schemas.microsoft.com/winfx/2006/xaml/presentation"
        xmlns:x="http://schemas.microsoft.com/winfx/2006/xaml"
        xmlns:pbwpf ="clr-
namespace:Sybase.PowerBuilder...;assembly=Sybase.PowerBuilder..."
PBHeight="800">
    <Canvas>
            <pbwpf:StaticText Name="st_1" X="256" Y="148" PBWidth="599"
                PBHeight="100" Weight="700" FaceName="System" TextColor="Window
                Text" BackColor="Button Face" Text="Select a file:"
                FocusRectangle="false" />
    </Canvas>
</pbwpf:UserObject>
```

In an example, during the separation process, the above CS11 code, including the new override attribute, is written to a temporary object 480 by inheritance module 120, and once separation has completed, this file 440 is saved to disk.

In an embodiment, the above described separate command handles various special types of controls, e.g., radio boxes, tab pages and group boxes. An embodiment stores information regarding these controls in hierarchy information 370 and retrieves ancestor information for the individual levels of the control. In the embodiment, library manager 380 directs the retrieval of user defined special controls, and these are then subject to the same merge and separate commands described above with respect to objects generally. Persons having skill in the art, with access to the above teachings, would appreciate the inheritance approach taken with respect to the above-noted objects.

The following non-limiting examples show the merging of programming objects having a "groupbox" control.

---

CS12 - Window "w_employee" Containing Unmerged Instance of "uo_fileselector"

```
<pbwpf:Window x:Class="w_employee"
        xmlns="http://schemas.microsoft.com/winfx/2006/xaml/presentation"
        xmlns:x="http://schemas.microsoft.com/winfx/2006/xaml"
        xmlns:pbwpf="clr-
namespace:Sybase.PowerBuilder...;assembly=Sybase.PowerBuilder..."
        TitleBar="true" PBTitle="Employee Data" MenuName="m_employee">
    <Canvas>
            <pbwpf:UserObject Name="uo_1" X="5" Y="5" />
            <pbwpf:CommandButton Name="cb_open" X="1755" Y="312" PBWidth="402"
                PBHeight="112" TabOrder="20" FaceName="Tahoma" Text="Open
                Employee" />
            <pbwpf:GroupBox Header="Region" Name="gb_1" Text="Region"
                PBHeight="232" PBWidth="1440" X="261" Y="432">
                <Grid>
                        <pbwpf:RadioButton HorizontalAlignment="Left" Margin="31,9,0,6"
                            Name="rb_1" Text="NA" PBHeight="76" PBWidth="224" X="142"
                            Y="36" />
                        <pbwpf:RadioButton Margin="0,9,135,7" Name="rb_2" Text="APO"
                            PBHeight="76" PBWidth="247" X="521" Y="36"
                            HorizontalAlignment="Right" />
                </Grid>
            </pbwpf:GroupBox>
            <pbwpf:MultiLineEdit Name="mle_1" X="261" Y="688" PBWidth="1893"
                PBHeight="700" TabOrder="30" FaceName="Tahoma" TextColor="Window
                Text" Text="none" BorderStyle="stylelowered" />
            <pbwpf:CommandButton Name="cb_exit" X="1751" Y="1492" PBWidth="402"
                PBHeight="112" TabOrder="40" FaceName="Tahoma" Text="Exit" />
    </Canvas>
</pbwpf:Window>
```

---

CS13 - Window "w_employee" Containing Merged Instance of "uo_fileselector"

```
<pbwpf:Window x:Class="w_employee"
        xmlns="http://schemas.microsoft.com/winfx/2006/xaml/presentation"
        xmlns:x="http://schemas.microsoft.com/winfx/2006/xaml"
        xmlns:pbwpf="clr-
namespace:Sybase.PowerBuilder...;assembly=Sybase.PowerBuilder..."
        TitleBar="true" PBTitle="Employee Data" MenuName="m_employee">
    <Canvas>
            <pbwpf:UserObject Name="uo_1" X="5" Y="5" PBHeight="680"
                PBWidth="1500" Height="170" Width="328">
                <Canvas>
                        <pbwpf:DropDownListBox Name="ddlb_1" X="256" Y="308"
                            PBWidth="1125" PBHeight="400" TabOrder="10"
                            FaceName="Tahoma" TextColor="Window Text"
                            BorderStyle="stylelowered" />
                        <pbwpf:StaticText Name="st_1" X="256" Y="148" PBWidth="599"
                            PBHeight="100" Weight="700" FaceName="System"
                            TextColor="Window Text" BackColor="Button Face" Text="Select
                            a file:" FocusRectangle="false" />
                </Canvas>
            </pbwpf:UserObject>
            <pbwpf:CommandButton Name="cb_open" X="1755" Y="312" PBWidth="402"
                PBHeight="112" TabOrder="20" FaceName="Tahoma" Text="Open
                Employee" />
            <pbwpf:GroupBox Header="Region" Name="gb_1" Text="Region"
                PBHeight="232" PBWidth="1440" X="261" Y="432">
                <Grid>
                        <pbwpf:RadioButton HorizontalAlignment="Left" Margin="31,9,0,6"
                            Name="rb_1" Text="NA" PBHeight="76" PBWidth="224" X="142"
                            Y="36" />
                        <pbwpf:RadioButton Margin="0,9,135,7" Name="rb_2" Text="APO"
                            PBHeight="76" PBWidth="247" X="521" Y="36"
                            HorizontalAlignment="Right" />
```

CS13 - Window "w_employee" Containing Merged Instance of "uo_fileselector"

```
            </Grid>
        </pbwpf:GroupBox>
        <pbwpf:MultiLineEdit Name="mle_1" X="261" Y="688" PBWidth="1893"
            PBHeight="700" TabOrder="30" FaceName="Tahoma" TextColor="Window
            Text" Text="none" BorderStyle="stylelowered" />
        <pbwpf:CommandButton Name="cb_exit" X="1751" Y="1492" PBWidth="402"
            PBHeight="112" TabOrder="40" FaceName="Tahoma" Text="Exit" />
    </Canvas>
</pbwpf:Window>
```

The CS14A non-limiting example lists the XAML for a window control, named "w_customer," which inherits from "w_employee," which in turn contains an inherited instance of "uo_fileselector" shown merged in CS13.

CS14A - Window "w_customer" inheriting from "w_employee"

```
<pbwpf:Window x:Class="w_customer"
        xmlns="http://schemas.microsoft.com/winfx/2006/xaml/presentation"
        xmlns:x="http://schemas.microsoft.com/winfx/2006/xaml"
        xmlns:pbwpf="clr-
namespace:Sybase.PowerBuilder...;assembly=Sybase.PowerBuilder..."
    PBTitle="Customer Data">
    <Canvas>
        <pbwpf:UserObject Name="uo_1" BackColor="Blue" />
        <pbwpf:CommandButton Name="cb_open" Text="Open Customer" />
        <pbwpf:GroupBox Name="gb_1">
            <Grid>
                <pbwpf:RadioButton HorizontalAlignment="Right"
                    Margin="0,9,33,7" Name="rb_3" Text="EMEA" PBHeight="76"
                    PBWidth="320" X="914" Y="36" />
            </Grid>
        </pbwpf:GroupBox>
        <pbwpf:CommandButton Name="cb_delete" X="1755" Y="476" PBWidth="402"
            PBHeight="112" TabOrder="25" BringToTop="true" Text="Delete
            Customer" />
    </Canvas>
</pbwpf:Window>
```

Listed below, in CS14B, when merged, the XAML for "w_employee" is merged into the code from CS13 "w_customer." This "w_customer" descendant overrides the PBTitle attribute of the root element, the BackColor attribute of "uo_1," and the Text attribute of "cb_open"

With respect to the special controls discussed above, the merger also extends the "w_employee" ancestor by adding another RadioButton to the inherited GroupBox control (shown in Bold), and adding another CommandButton control (also shown in bold).

CS14B - Window "w_customer" Merged with "w_employee"

```
<pbwpf:Window x:Class="w_customer"
        xmlns=" http://schemas.microsoft.com/winfx/2006/xaml/presentation"
        xmlns:x="http://schemas.microsoft.com/winfx/2006/xaml"
        xmlns:pbwpf="clr-
namespace:Sybase.PowerBuilder...;assembly=Sybase.PowerBuilder..."
    PBTitle="Customer Data" TitleBar="true" MenuName="m_employee">
    <Canvas>
        <pbwpf:UserObject Name="uo_1" BackColor="Blue" X="5" Y="5"
            PBHeight="680" PBWidth="1500" Height="170" Width="328">
            <Canvas>
                <pbwpf:DropDownListBox Name="ddlb_1" X="256" Y="308"
                    PBWidth="1125" PBHeight="400" TabOrder="10"
                    FaceName="Tahoma" TextColor="Window Text"
                    BorderStyle="stylelowered" />
                <pbwpf:StaticText Name="st_1" X="256" Y="148" PBWidth="599"
                    PBHeight="100" Weight="700" FaceName="System"
                    TextColor="Window Text" BackColor="Button Face" Text="Select
                    a file:" FocusRectangle="false" />
            </Canvas>
        </pbwpf:UserObject>
        <pbwpf:CommandButton Name="cb_open" Text="Open Customer" X="1755"
            Y="312" PBWidth="402" PBHeight="112" TabOrder="20"
```

-continued

CS14B - Window "w_customer" Merged with "w_employee"

```
        FaceName="Tahoma" />
    <pbwpf:GroupBox Header="Region" Name="gb_1" Text="Region"
        PBHeight="232" PBWidth="1440" X="261" Y="432">
        <Grid>
            <pbwpf:RadioButton HorizontalAlignment="Left" Margin="31,9,0,6"
                Name="rb_1" Text="NA" PBHeight="76" PBWidth="224" X="142"
                Y="36" />
            <pbwpf:RadioButton Margin="0,9,135,7" Name="rb_2" Text="APO"
                PBHeight="76" PBWidth="247" X="521" Y="36"
                HorizontalAlignment="Right" />
            <pbwpf:RadioButton HorizontalAlignment="Right"
                Margin="0,9,33,7" Name="rb_3" Text="EMEA" PBHeight="76"
                PBWidth="320" X="914" Y="36" />
        </Grid>
    </pbwpf:GroupBox>
    <pbwpf:CommandButton Name="cb_delete" X="1755" Y="476" PBWidth="402"
        PBHeight="112" TabOrder="25" BringToTop="true" Text="Delete
        Customer" />
    <pbwpf:MultiLineEdit Name="mle_1" X="261" Y="688" PBWidth="1893"
        PBHeight="700" TabOrder="30" FaceName="Tahoma" TextColor="Window
        Text" Text="none" Borderstyle="stylelowered" />
    <pbwpf:CommandButton Name="cb_exit" X="1751" Y="1492" PBWidth="402"
        PBHeight="112" TabOrder="40" FaceName="Tahoma" Text="Exit" />
    </Canvas>
</pbwpf:Window>
```

It should be noted that the added RadioButton shown above in CS14B is nested in a hierarchical skeleton of the named GroupBox and Grid controls to match its ancestor structure. An embodiment described herein, upon execution of the separation command, detects the ancestor structure of added, nested controls, e.g., the RadioButton shown above, and matches the hierarchical structure of such controls in the separated parts.

Method 500

Figure 5A:
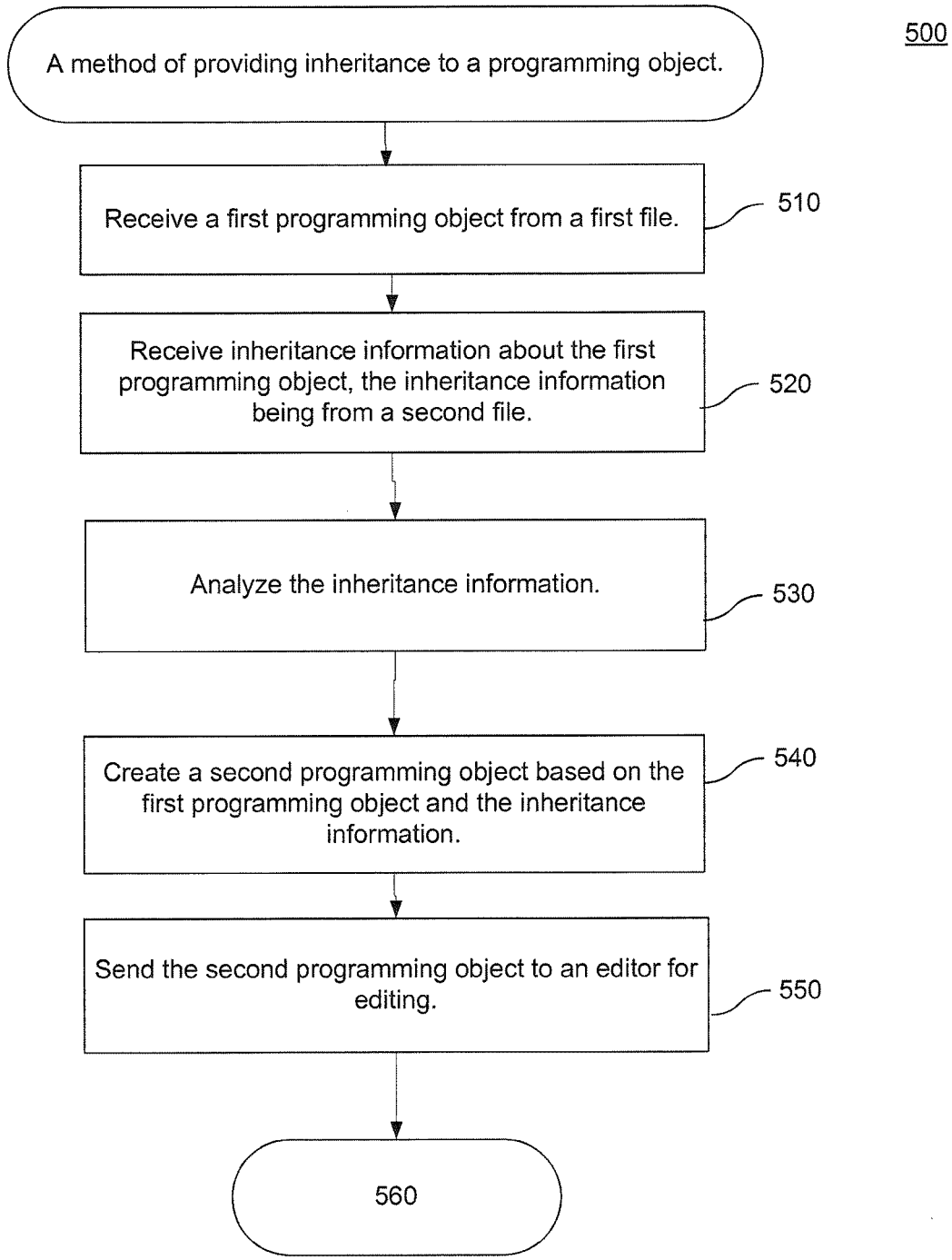
FIGS. 5A-B show a flowchart illustrating a method of providing inheritance to a programming language according to an embodiment of the invention.
Figure 5B:
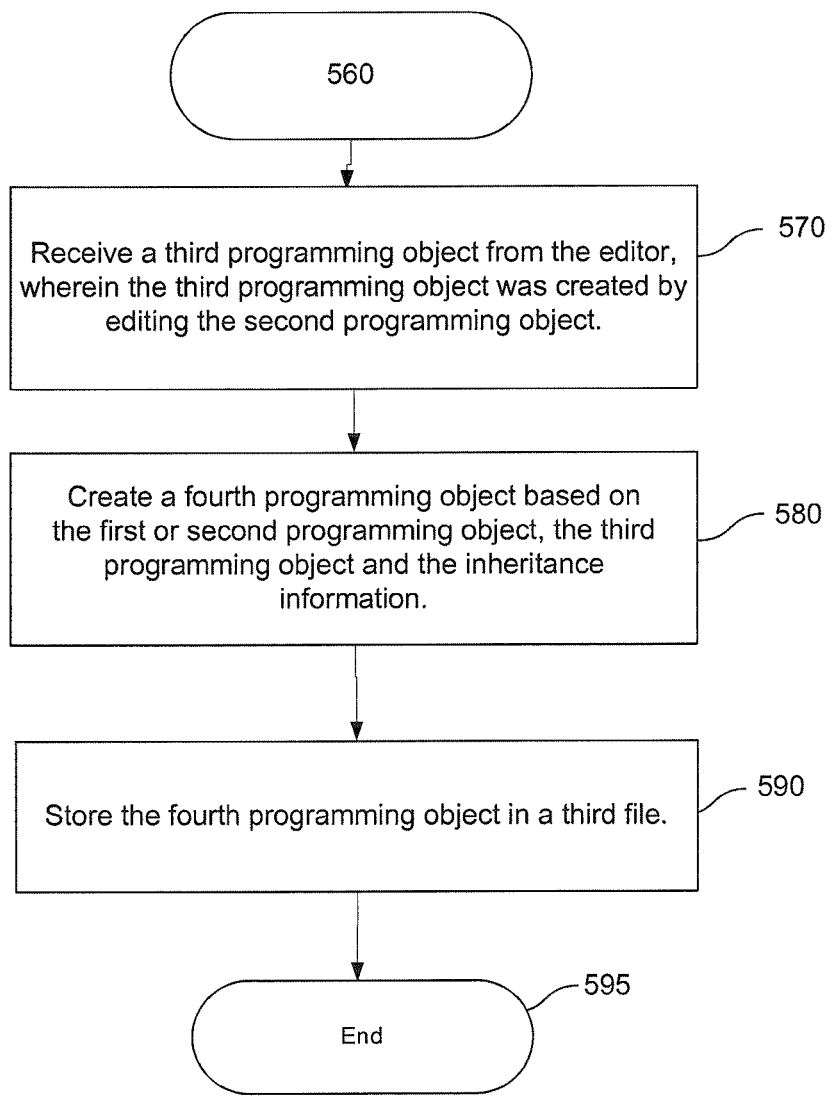

This section and FIGS. 5A-B summarize the techniques described herein by presenting a flowchart of an exemplary method 500 of providing inheritance to a programming object. While method 500 is described with respect to an embodiment of the present invention, method 500 is not meant to be limiting and may be used in other applications.

As shown in FIG. 5A, an embodiment of method 500 begins at step 510 where a programming object is received from a first file. In an embodiment, programming object, such as object 340 of FIG. 3, is received by inheritance module 120 from FIGS. 1, 3 and 4. Once step 510 is complete, method 500 proceeds to step 520.

At step 520, inheritance information is received about the first programming object. In an embodiment, inheritance information, such as information from inheritance information 370 is received by inheritance module 120 about object 340. Once step 520 is complete, method 500 proceeds to step 530.

At step 530 the inheritance information is analyzed. In an embodiment, inheritance module 120 analyzes the received inheritance information from inheritance information 370 about object 340. Once step 530 is complete, method 500 proceeds to step 540.

At step 540, a second programming object is created based on the first programming object and the inheritance information. In an embodiment, inheritance module 120 creates a second programming object 390 based on the first programming object 340 and inheritance information 370. Once step 540 is complete, method 500 proceeds to step 550.

At step 550, the second programming object is sent to an editor for editing. In an embodiment, inheritance module 120 sends programming object 390 to editor 110. Once step 550 is complete, method 500 proceeds to step 570 on FIG. 2B.

At step 570, a third programming object is received from the editor, wherein the third programming object was created by editing the second programming object. In an embodiment, a third programming object, edited object 430, is received by inheritance module 120, wherein edited object 430 was edited by editor 110. Once step 570 is complete, method 500 proceeds to step 580.

At step 580, a fourth programming object is created based on the first or second programming object, the third programming object and the inheritance information. In an embodiment, a fourth programming object, temporary object 480, is created by inheritance module 120, based on either object 440 or cached object 495 (a cached version of object 390) and inheritance information 370. Once step 580 is complete, method 500 proceeds to step 590.

At step 590 the fourth programming object is stored in a second file. In an embodiment, temporary object 480 is stored in object storage 160 as object 450. Once step 590 is complete, method 500 proceeds to step 595.

At step 595, the operation ends.

Example Computer Embodiment

Figure 6:
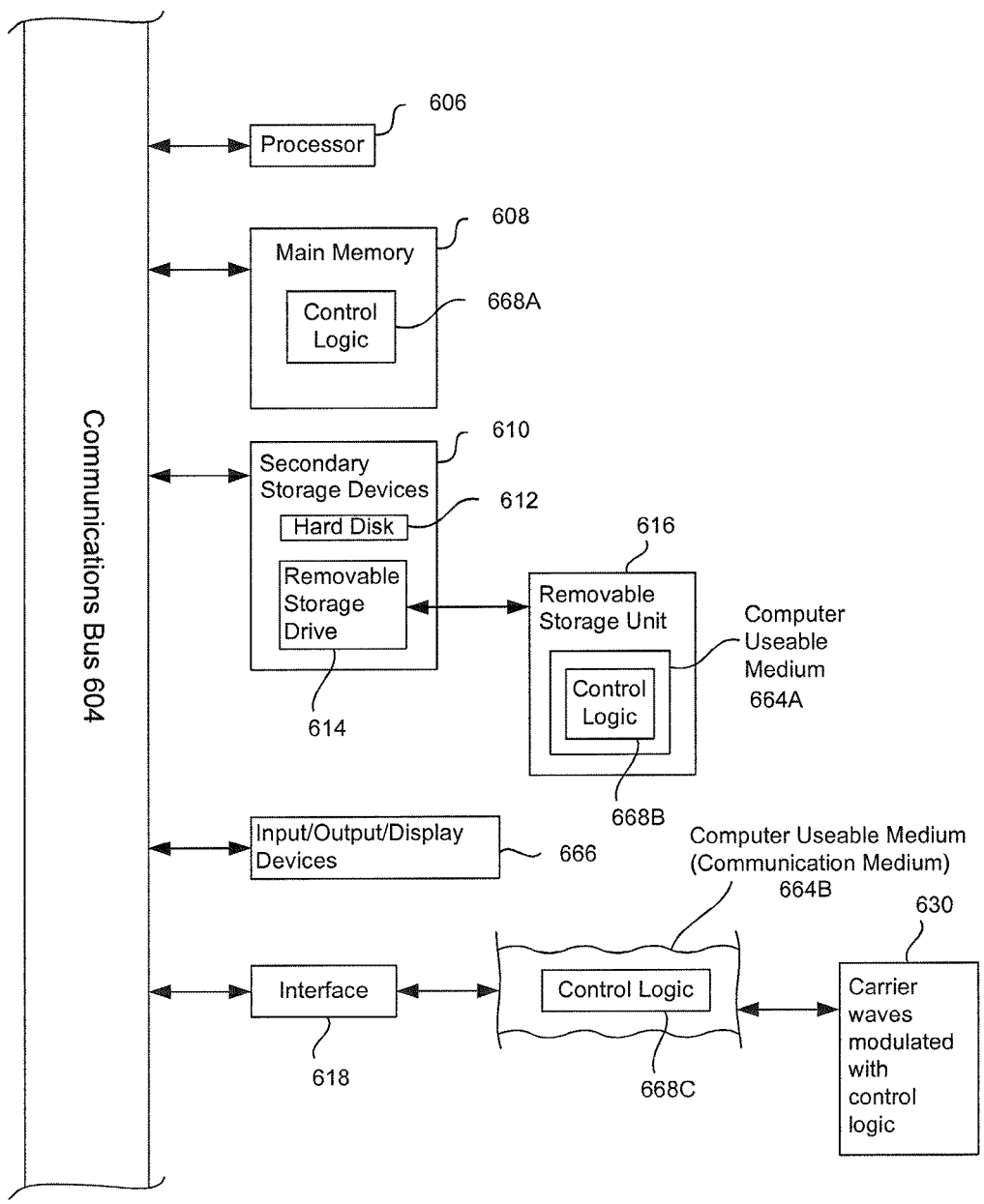
FIG. 6 illustrates an example computer system, useful for implementing components of embodiments described herein.

In an embodiment of the present invention, the system and components of embodiments described herein are implemented using well known computers, such as computer 602 shown in FIG. 6. For example, computing device 190, object storage 160, and the operation of flowcharts in FIGS. 5A-B described above, can be implemented using computer(s) 602.

Computer 602 can be any commercially available and well known computer capable of performing the functions described herein, such as computers available from International Business Machines, Apple, Sun, HP, Dell, Compaq, Digital, Cray, etc.

The computer 602 includes one or more processors (also called central processing units, or CPUs), such as a processor 606. The processor 606 is connected to a communication bus 604.

The computer 602 also includes a main or primary memory 608, such as random access memory (RAM). The primary memory 608 has stored therein control logic 628A (computer software), and data.

The computer 602 also includes one or more secondary storage devices 610. The secondary storage devices 610 include, for example, a hard disk drive 612 and/or a removable storage device or drive 614, as well as other types of storage devices, such as memory cards and memory sticks. The removable storage drive 614 represents a floppy disk drive, a magnetic tape drive, a compact disk drive, an optical storage device, tape backup, etc.

The removable storage drive 614 interacts with a removable storage unit 616. The removable storage unit 616 includes a computer useable or readable storage medium 624 having stored therein computer software 628B (control logic) and/or data. Removable storage unit 616 represents a floppy disk, magnetic tape, compact disk, DVD, optical storage disk, or any other computer data storage device. The removable storage drive 614 reads from and/or writes to the removable storage unit 616 in a well known manner.

The computer 602 also includes input/output/display devices 622, such as monitors, keyboards, pointing devices, etc.

The computer 602 further includes a communication or network interface 618. The network interface 618 enables the computer 602 to communicate with remote devices. For example, the network interface 618 allows the computer 602 to communicate over communication networks or mediums 624B (representing a form of a computer useable or readable medium), such as LANs, WANs, the Internet, etc. The network interface 618 may interface with remote sites or networks via wired or wireless connections.

Control logic 628C may be transmitted to and from the computer 602 via the communication medium 624B. More particularly, the computer 602 may receive and transmit carrier waves (electromagnetic signals) modulated with control logic 630 via the communication medium 624B.

Any apparatus or manufacture comprising a computer useable or readable medium 664 having control logic (software) 668 stored therein is referred to herein as a computer program product or program storage device. This includes, but is not limited to, the computer 602, the main memory 608, secondary storage devices 610, the removable storage unit 616 and the carrier waves modulated with control logic 630. Such computer program products, having control logic stored therein that, when executed by one or more data processing devices, cause such data processing devices to operate as described herein, represent embodiments of the invention.

The invention can work with software, hardware, and/or operating system implementations other than those described herein. Any software, hardware, and operating system implementations suitable for performing the functions described herein can be used.

CONCLUSION

Embodiments described herein provide methods and systems for providing object inheritance support to a programming language. The summary and abstract sections may set forth one or more but not all exemplary embodiments of the present invention as contemplated by the inventors, and thus, are not intended to limit the present invention and the claims in any way.

The embodiments herein have been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

The foregoing description of the specific embodiments will so fully reveal the general nature of the invention that others may, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the claims and their equivalents.

What is claimed is:

1. A computer-implemented method of providing inheritance to a programming object, comprising:
receiving a first programming object included in a first document, wherein the first programming object is described in a declarative language;
receiving inheritance information about the first programming object, wherein the inheritance information associated with the first programming object is stored separately from the first programming object;
analyzing the inheritance information, wherein the analyzing identifies at least one base object from which the first programming object inherits at least one property;
based on the analyzing, generating a merged first programming object, wherein the generating merges the at least one property of the at least one base object into the first document and within the first programming object, and wherein the generating further comprises:
recursively analyzing each element of a node of the at least one base object identified in the inheritance information; and
determining the at least one property to be inherited by the first programming object from the at least one base object based on the recursively analyzing each element of the node; and
sending the merged first programming object to an editor for editing.

2. The method of claim 1, wherein the declarative language is an Extensible Markup Language (XML).

3. The method of claim 2, wherein the XML is an Extensible Application Markup Language (XAML).

4. The method of claim 1, wherein the merged first programming object is a temporary version of the first programming object for editing in the editor, the merged first programming object including the at least one inherited property from the at least one base object of the first programming object specified in the inheritance information.

5. The method of claim 1, wherein the at least one property of the first programming object comprises differences between the first programming object and the at least one base object of the first programming object.

6. The method of claim 1, further comprising:
receiving a second programming object from the editor, wherein the second programming object includes the merged first programming object and changes made to the merged programming object;

identifying the changes made in the second programming object; and storing the changes and the first programming object as a final version of the first programming object.

7. A system for providing inheritance to a programming object comprising:

a memory;

an object storage stored in the memory and containing inheritance information about programming objects, wherein the inheritance information is stored separately from the programming objects and where the programming objects are included in a file and are described in a declarative language; and a computing device coupled to the object storage, and including:

an editor configured to request a programming object for editing; and an inheritance module configured to interface with the editor, and further configured to:

intercept the programming object before the programming object is displayed by the editor;

automatically generate a replacement inheritance supported object for editing by the editor by selectively merging into the file and within the programming object at least one property included in a lineage of its ancestors according to rules of inheritance and based on the inheritance information associated with the programming object, wherein to selectively merge the at least one property into the file the inheritance module is further configured to:

recursively analyze each element of a node of an ancestor of the programming object identified in the inheritance information;

determine the at least one property to be inherited by the programming object based on the analyzing; and merge the determined at least one property into the replacement inheritance supported object; and transmit the replacement inheritance supported object to the editor, whereby the editor receives instructions that edit the replacement inheritance supported object.

8. The system of claim 7, wherein the declarative language is an Extensible Markup Language (XML).

9. The system of claim 8, wherein the XML is an Extensible Application Markup Language (XAML).

10. The system of claim 7, wherein the inheritance supported object is a temporary version of the programming object for editing in the editor, the inheritance supported object including inherited at least one property of ancestors of the programming object.

11. The system of claim 7, wherein the determined at least one property of the programming object comprises the differences between the programming object and ancestors of the programming object.

12. The system of claim 7, wherein the inheritance module is further configured to:

receive a second programming object from the editor, wherein the second programming object includes the inheritance supported object and changes made to the inheritance supported object;

identify the changes made in the inheritance supported object; and store the changes and the programming object as a final version of the first programming object.

13. A non-transitory computer-readable medium having computer-executable instructions stored thereon that, if executed by a computing device, cause the computing device to perform operations comprising:

receiving a first programming object, wherein the first programming object is described in a declarative language;

receiving inheritance information about the first programming object, wherein the inheritance information associated with the first programming object is stored separately from the first programming object;

analyzing the inheritance information, wherein the analyzing identifies at least one base object from which the first programming object inherits at least one attribute;

based on the analyzing, generating a merged first programming object, wherein the generating merges the at least one attribute of the at least one base object into the first document and within the first programming object, wherein the generating further comprises:

recursively analyzing each element of a node of the at least one base object identified in the inheritance information; and determining the at least one attribute to be inherited by the first programming object from the at least one base object based on the analyzing; and sending the merged first programming object to an editor for editing.

14. The computer-readable medium of claim 13, wherein the declarative language is an Extensible Markup Language (XML).

15. The computer-readable medium of claim 14, wherein the XML is an Extensible Application Markup Language (XAML).

16. The computer-readable medium of claim 13, wherein the merged first programming object is a temporary version of the first programming object for editing in the editor, the merged first programming object includes the at least one inherited attribute from the at least one base object of the first programming object specified in the inheritance information.

17. The computer-readable medium of claim 13, wherein the at least one attribute of the first programming object comprises differences between the first programming object and the at least one base object of the first programming object.

* * * * *